United States Patent
Krude et al.

(10) Patent No.: US 6,398,657 B2
(45) Date of Patent: Jun. 4, 2002

(54) CONSTANT VELOCITY FIXED JOINT

(75) Inventors: Werner Krude, Lohmar; Peter Harz, Hennef, both of (DE)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/750,898

(22) Filed: Dec. 28, 2000

(30) Foreign Application Priority Data

Dec. 30, 1999 (DE) .......................................... 199 63 617

(51) Int. Cl.⁷ ................................................ F16D 3/223
(52) U.S. Cl. ...................................... 464/145; 464/906
(58) Field of Search ................................ 464/145, 906, 464/141, 143

(56) References Cited

U.S. PATENT DOCUMENTS

| | | | |
|---|---|---|---|
| 1,916,442 A | | 7/1933 | Rzeppa |
| 2,875,600 A | * | 3/1959 | Miller, Jr. .................... 464/145 |
| 3,324,682 A | * | 6/1967 | Bendler ....................... 464/145 |
| 3,370,441 A | * | 2/1968 | Aucktor ....................... 464/145 |
| 3,935,717 A | * | 2/1976 | Welschof ..................... 464/145 |
| 3,982,840 A | | 9/1976 | Grosseau |
| 4,090,375 A | * | 5/1978 | Takahashi et al. .......... 464/145 |
| 4,275,571 A | * | 6/1981 | Welschof ..................... 464/145 |
| 4,610,643 A | * | 9/1986 | Krude ......................... 464/143 |
| 5,221,233 A | * | 6/1993 | Jacob ......................... 464/145 |
| 5,509,857 A | | 4/1996 | Flaugher |
| 5,685,777 A | * | 11/1997 | Schwarzler .................. 464/145 |
| 5,885,162 A | | 3/1999 | Sakamoto et al. |
| 6,120,382 A | * | 9/2000 | Sone et al. .................. 464/145 |

FOREIGN PATENT DOCUMENTS

GB 847569 11/1960

* cited by examiner

*Primary Examiner*—Kathy Matecki
*Assistant Examiner*—Kenn L Thompson

(57) ABSTRACT

The invention relates to a constant velocity fixed joint and to the introduction of the cage into the outer joint part of a constant velocity fixed joint. The joint comprises an outer joint part, an inner joint part, a ball cage and balls. The outer joint part forms a bell-shaped member comprising a first longitudinal axis, a base, an aperture and circumferentially alternating first and second outer ball tracks. The inner joint part forms a hub comprising a second longitudinal axis and circumferentially alternating first and second inner ball tracks. The first outer and first inner ball tracks, together form first track pairs and the second outer and second inner ball tracks, together, form second track pairs. Each track pair accommodates a torque transmitting ball, with the tangents at the balls in the points of contact with the track pairs forming control angles. The first track pairs form control angles which open towards the aperture in the outer joint part and the second track pairs form control angles which open towards the base of the outer joint part. The outer joint part comprises a substantially internally spherical guiding face which is widened by two recesses which start from the joint aperture and extend into the joint interior.

14 Claims, 5 Drawing Sheets

CONSTANT VELOCITY FIXED JOINT

BACKGROUND OF THE INVENTION

The invention relates to constant velocity fixed joints. In particular, the invention relates to a constant velocity fixed joint in the form of a six-ball joint having the following characteristics: an outer joint part forming a bell-shaped member which comprises a first longitudinal axis, a base, an aperture and outer ball tracks; an inner joint part forming a hub which comprises a second longitudinal axis and inner ball tracks; the outer ball tracks have center lines which are curved and extend in planes through the first longitudinal axis, and comprise circumferentially alternately arranged three first outer ball tracks and three second outer ball tracks; the inner ball tracks have center lines which are curved and extend in planes through the second longitudinal axis, and comprise circumferentially alternately arranged three first inner ball tracks and three second inner ball tracks; the first outer ball tracks and the first inner ball tracks, together, form three first track pairs and the second outer ball tracks and the second inner ball tracks, together, form three second track pairs; the track pairs each accommodate a torque transmitting ball and tangents at the balls in the points of contact with the track pairs lying in planes through the longitudinal axes or in planes being parallel thereto form control angles with one another; the three first track pairs form control angles which open towards the aperture in the outer joint part; the three second track pairs form control angles which open towards the base of the outer joint part; a ball cage is positioned between the outer joint part and the inner joint part and comprises circumferentially distributed cage windows for one ball each, which cage windows hold the balls in one plane; the outer joint part comprises a substantially internally spherical guiding face for the ball cage, the ball cage comprises an externally spherical sliding face which is in sliding contact with the guiding face and ensures axial positioning.

Joints of this type are known as UFC joints (undercut-free counter grooves) or ACC joints (angular contact counter grooves), depending on whether the track center lines are formed by circular arches forming undercuts and being offset relative to one another (AC) or whether the track center lines in each of the joint parts, if viewed axially, are undercut-free and are composed especially of circular arches and adjoining straight lines (UF).

As said second track pairs are wedged towards the aperture of the outer joint part, the second outer ball tracks in the plane of the aperture form only relatively small widened regions in the guiding face of the outer joint part, as a result of which the introduction of the ball cage into the outer joint part is obstructed and can only be achieved, for example, by removing a substantial amount of material from the outer joint part. As a result, the amount by which the balls are enclosed by the ball tracks at the track end is reduced, which, in turn, reduces the torque transmitting capacity. In prior art joints, the ball cage is introduced into the outer joint part in a position which—with reference to a position which is co-axial relative to the outer joint part—is rotated by 90° around a transverse axis through its center. Herein, in the aperture plane of the outer joint part, a web region between two ball tracks engages a cage window opening.

SUMMARY OF THE INVENTION

It is an object of the present invention to provide a joint of said type which, while making optimum use of the material used for the enclosure of the balls by the ball tracks in the outer joint part at the track end, offers a greater degree of design freedom in respect of ball sizes and the axial extension of the guiding face while providing more advantageous assembly conditions. It is also an object of the invention to provide a method of introducing the cage into the outer part of such a joint.

According to the present invention, the foregoing objects are achieved by a constant velocity fixed joint wherein the guiding face in the outer joint part is widened by two recesses which start from the joint aperture and extend approximately in parallel and cylindrically into the joint interior, which—with reference to one (I) of the second outer ball tracks—are positioned between the two (II) first outer ball tracks immediately adjoining said one (I) of the second outer ball tracks and the two (III) second outer ball tracks again immediately adjoining said two (II) first outer ball tracks. The cross-sectional contour of the recesses, while observing an assembly play, is defined by the radial elevational contour of the ball cage when the latter, by means of a central plane thereof, is positioned perpendicularly on a central plane through said one (I) of the second outer ball tracks and brought into simultaneous contact with the two (II) first outer ball tracks immediately adjoining said one (I) of the second outer ball tracks. In addition, the ball cage is offset from a symmetric central position in the aperture towards said one (I) of the second outer ball tracks by an offset $O_{FF}$.

This design measure eliminates the restriction to which prior art joints were subjected in respect of the relation between window width in the ball cage and web width between two ball tracks in the outer joint part in view of a possible introduction of the cage into the outer joint part. At the same time, this design measure offers the possibility of providing guiding faces in the outer joint part with optionally a longer or shorter axial extension.

Concrete embodiments can be characterized by the following features: the cross-sectional contour of the recesses is defined by a circular arch of diameter D which is greater than or equal to the diameter d of the guiding face in the plane of the joint aperture and greater than a relative maximum cross-section assembly dimension m at the sliding face of the ball cage; the cross-sectional contour of the recesses is formed by wedges which are symmetric relative to one another and whose flanks positioned towards said two second outer ball tracks form an angle of approximately 60° relative to one another; the cross-sectional contour of the recesses is defined by a circular arch with a radius which is slightly greater than the radius of the sliding face of the ball cage and which is offset from the central joint axis towards said one of the second outer ball tracks.

As can also be seen in the preferred embodiments described below, the outer joint part can comprise a base which is integrally formed on or, alternatively, attached by friction welding.

The inventive method of introducing the cage, as a function of the design, is characterized in that the ball cage, when one of its central radial cross-sections passes through the plane of the aperture of the outer joint part, is directed with its axis to said one of the second outer ball tracks and is offset from a symmetric central position in the aperture towards said one of the second outer ball tracks by an offset $O_{FF}$ wherein, especially, the ball cage, when one of its radial cross-sections passes through the plane of the aperture of the outer joint part, is rotated around its axis in such a way that, in the radial elevational contour, two cage windows are visible in the sliding face of the ball cage in a chamfered manner, i.e. the plane of the aperture centrally intersects two radially opposed cage windows.

Outer joint parts and cages in accordance with the invention compared with joints according to the state of the art will be described below with reference to the drawings wherein

BRIEF DESCRIPTION OF THE DRAWINGS

Preferred embodiments of the invention are illustrated in the attached drawings and will be described with reference thereto.

DETAILED DESCRIPTION OF THE INVENTION

Figure 1:
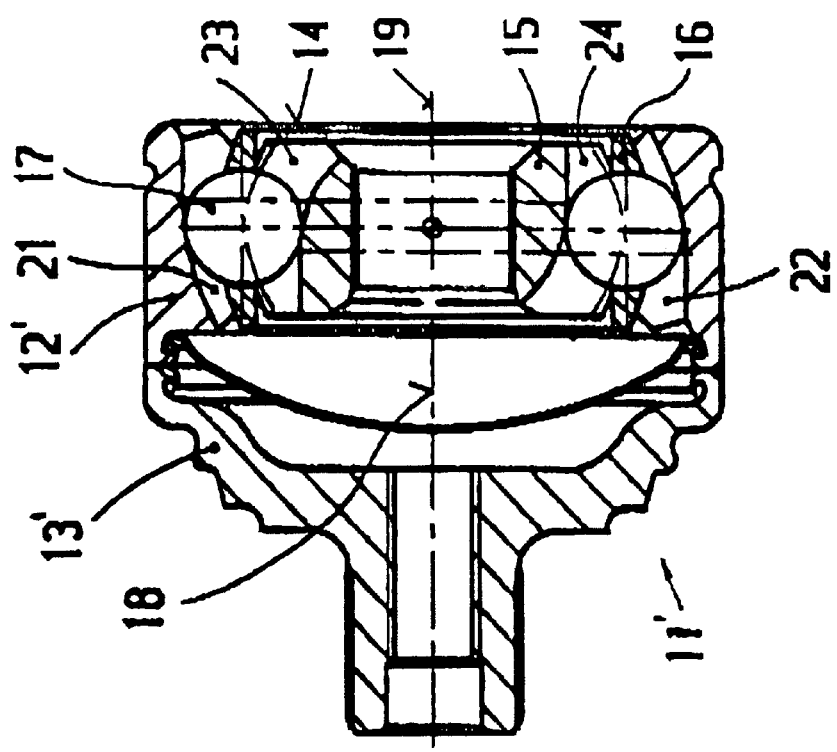
FIG. 1 shows an ACC joint in a longitudinal section through two radially opposed (first and second) track pairs.
Figure 2:
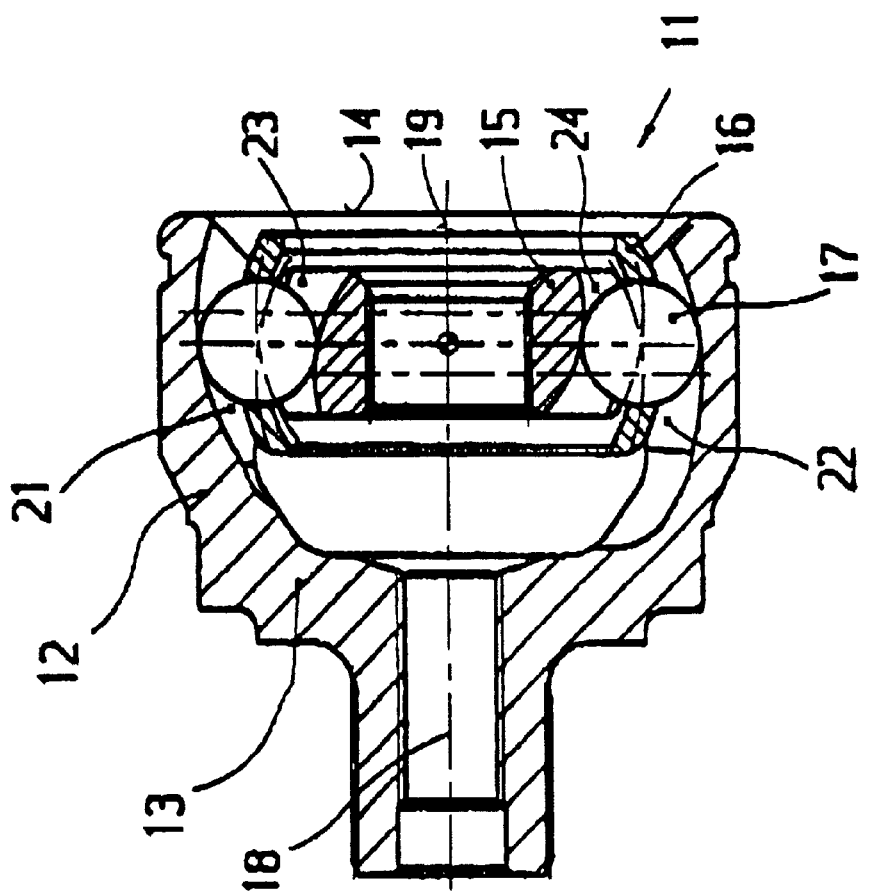
FIG. 2 shows a UFC joint in a longitudinal section through two radially opposed (first and second) track pairs.

FIGS. 1 and 2 will be described jointly below. FIG. 1 shows a joint 11 comprising an outer joint part 12 having an integrally formed-on base 13, and an aperture 14, whereas FIG. 2 shows a joint 11' having an outer joint part 12' with a welded-on base 13', and an aperture 14. Furthermore, both joints comprise an inner joint part 15, a ball cage 16 and torque transmitting balls 17. The outer joint part comprises a first longitudinal axis 18 and the inner joint part a second longitudinal axis 19 which, in the position as indicated, coincide. In the upper half of FIG. 1, there can be seen a first track pair which is formed of a first outer ball track 21 in the outer joint part and of a first inner ball track 23 in the inner joint part. Said first track pair is widened towards the aperture 14 of the joint. In the lower half of FIG. 1, there is shown a second track pair which is formed of a second outer ball track 22 in the outer joint part and of a second inner ball track 24. The second track pair opens towards the base 13 of the joint. The centerlines of the track pairs with undercuts are formed by circular arches whose centers are axially offset relative to one another. In the upper half of FIG. 2, there can be seen a first track pair which is formed by a first outer ball track 25 in the outer joint part and of a first inner ball track 27 in the inner joint part. Said first track pair is widened towards the aperture 14 of the joint. In the lower half of the Figure there is shown a second track pair which is formed of a second outer ball track 26 in the outer joint part and of a second inner ball track 28. The second track pair opens towards the base 13' of the joint. The centerlines of the undercut-free track pairs are formed by circular arches which are adjoined by tangential straight lines whose centers are axially offset relative to one another. The track shapes of the joints in FIGS. 1 and 2 can be combined with one another in one joint in that undercut-free first tracks can be combined with second tracks with undercuts, and vice versa.

Figure 4:
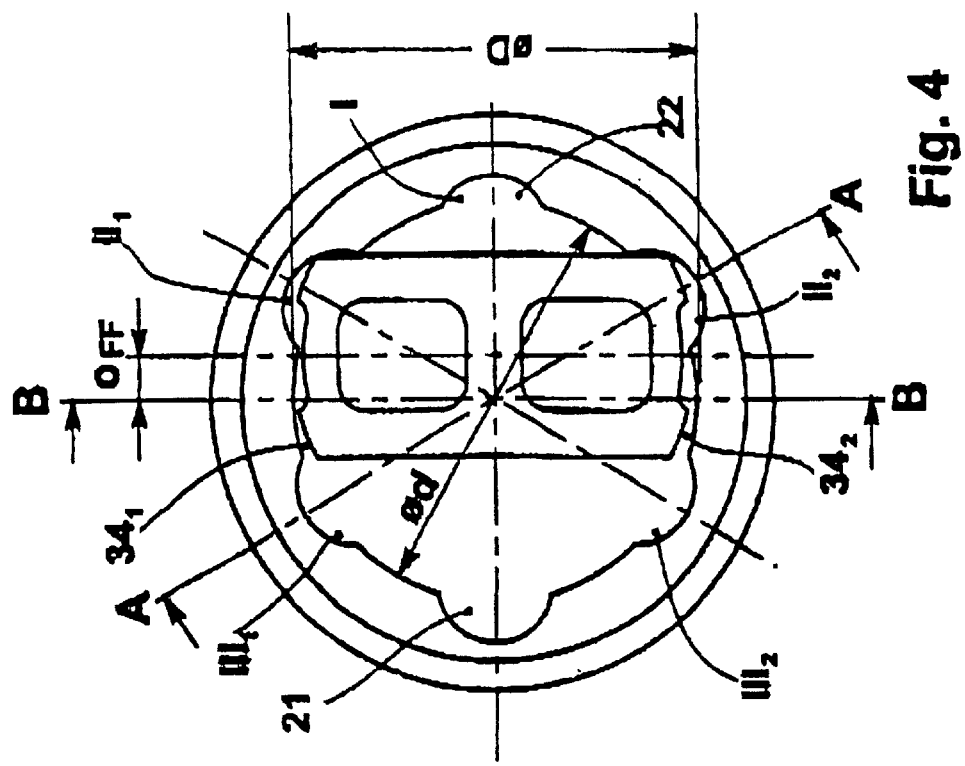
FIG. 4 shows the outer joint part and the ball cage according to FIG. 3 in an axial view of the opening of the outer joint part.
Figure 3:
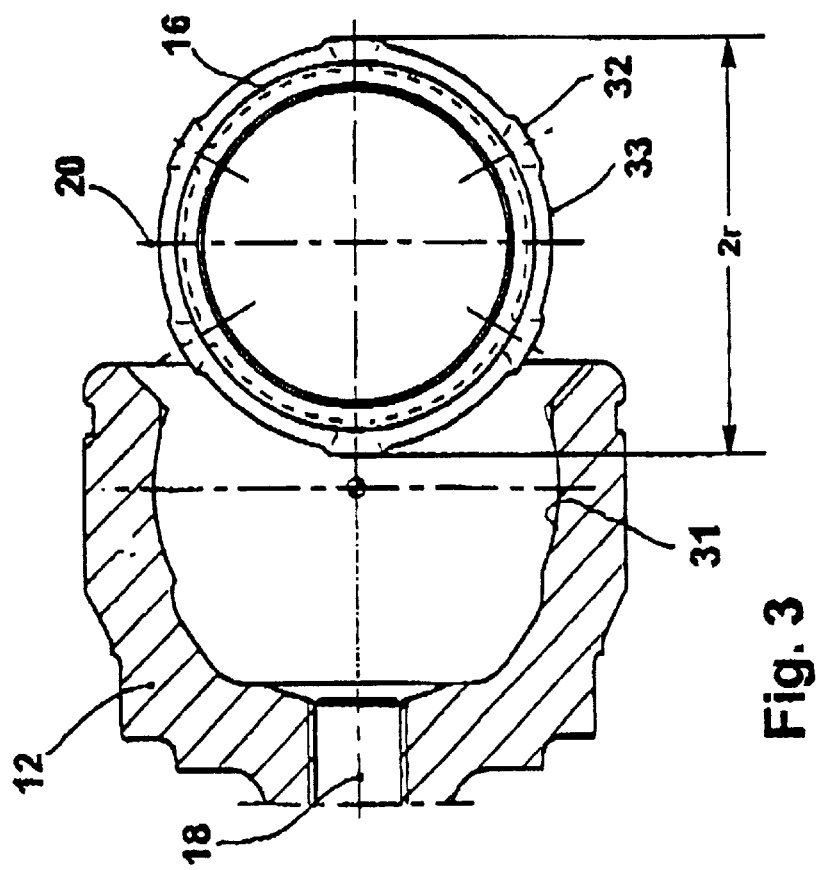
FIG. 3 shows an outer joint part and a cage of an inventive joint in a first embodiment during assembly in a longitudinal section through the longitudinal axis of the outer joint part.

FIG. 3 shows the outer joint part 12 in a section along sectional line B—B of FIG. 4 through the web region between two ball tracks. The ball cage 16 is shown in a position in which it is rotated around one of its transverse axes 20 by 90° (which cannot be seen in this Figure) and displaced along its axis from the central axis of the outer joint part, this position being set for assembly purposes. As far as details are concerned, it can be seen that the outer joint part 12 comprises the guiding face 31 and the ball cage 16 the sliding face 32. The latter is interrupted by the cage windows 33. For assembly purposes, a region of the guiding face 31 between two outer ball tracks is introduced into one of the cage windows 33 shown in a chamfered condition in a plan view of the joint aperture, with the ball cage 16 being introduced into the outer joint part 12 while carrying out a displacing or rotating movement until the guiding face 31 and the counter face 32 are in contact on opposed sides of the outer joint part. The cage, i.e. the cage center, is then returned on to the central axis of the outer joint part and rotated back around a transverse axis by 90° into the predetermined position. Subsequently, the inner joint part and the balls are assembled as explained above.

FIG. 4 shows the outer joint part 12 and the cage 16 according to FIG. 3, again during assembly, in positions corresponding to those of FIG. 3, but in an axial view of the longitudinal axis 18 of the outer joint part 12. It can be seen that first outer ball tracks 21 and second outer ball tracks 22 alternate around the circumference. A first one of the second outer ball tracks 22 has been given the symbol I, the two adjoining first outer ball tracks 21 have been given the symbols $II_1$, $II_2$ and the second outer ball tracks 22 adjoining the latter the symbols $III_1$, $III_2$.

The cage is offset by an offset $O_{FF}$ towards said first (I) of the second outer ball tracks 22 in such a way that it continues to engage the two ($II_1$, $II_2$) adjoining first outer ball tracks 21 as well as the recesses $34_1$, $34_2$ which are formed by cylindrical lines on a diameter D which is greater than the diameter d of the joint aperture.

The offset $O_{FF}$ is determined from the distance that the cage, up to the point of contact with said two ($II_1$, $II_2$) first outer ball tracks 21, is offset from a symmetric central position.

Figure 5:
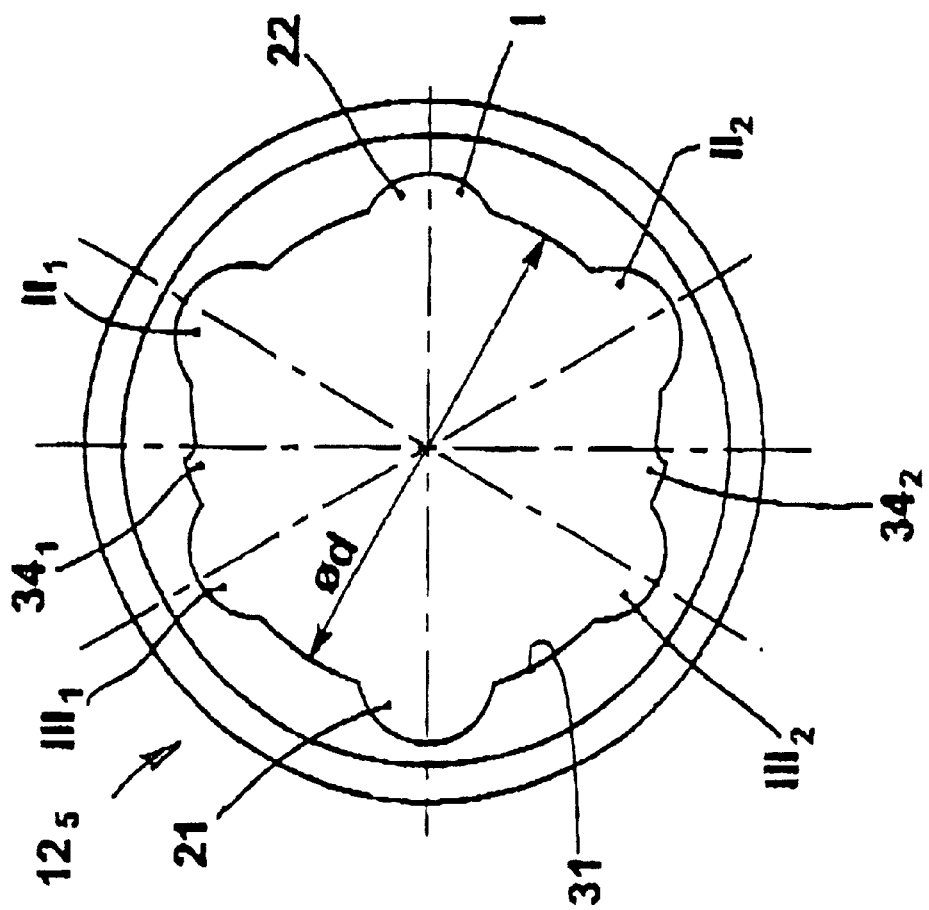
FIG. 5 shows an outer joint part of an inventive joint in a second embodiment in an axial view of the joint aperture in a first embodiment.

FIG. 5 shows an outer joint part $12_5$ in an inventive embodiment in an axial view of the aperture $14_5$. First outer ball tracks 21 and second outer ball tracks 22 alternate around the circumference. Because of their different centers of curvature, they cut unequally deeply into the guiding face 31 in the aperture plane. A first one of the second outer ball tracks 22 has been given the symbol I, the two adjoining first outer ball tracks 21 the symbols $II_1$, $II_2$ and the second outer ball tracks 22 adjoining the latter the symbols $III_1$, $III_2$. Said symbols are referred to in the claims. Between each two tracks referred to as $II_1$ and $II_2$ and each two tracks referred to as $III_1$ and $III_2$ there are provided recesses $34_1$, $34_2$ which, in the aperture plane, cut into the guiding face 31 from where they continue with axis-parallel cylindrical lines into the joint interior.

Figure 6:
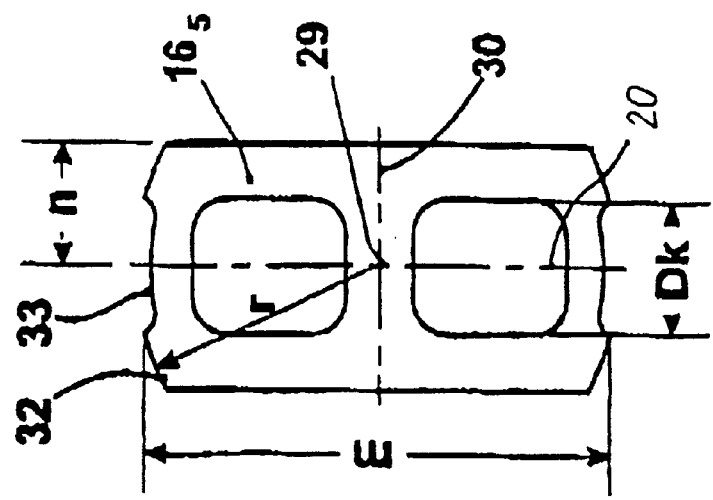
FIG. 6 shows the cage of an inventive joint according to FIG. 5 in a radial view.

FIG. 6 shows a ball cage $16_5$ with a transverse axis 20 through its center 29 and its longitudinal axis 30, said cage being illustrated in a radial view in such a way that there appear two radially opposed cage windows 33 in a chamfered condition in the radial elevational contour of the sliding face 32. Over the edges of said cage windows there is entered an assembly dimension "m" which specifies the internal dimension in the outer joint part over the recesses $34_1$, $34_2$.

Figure 7:
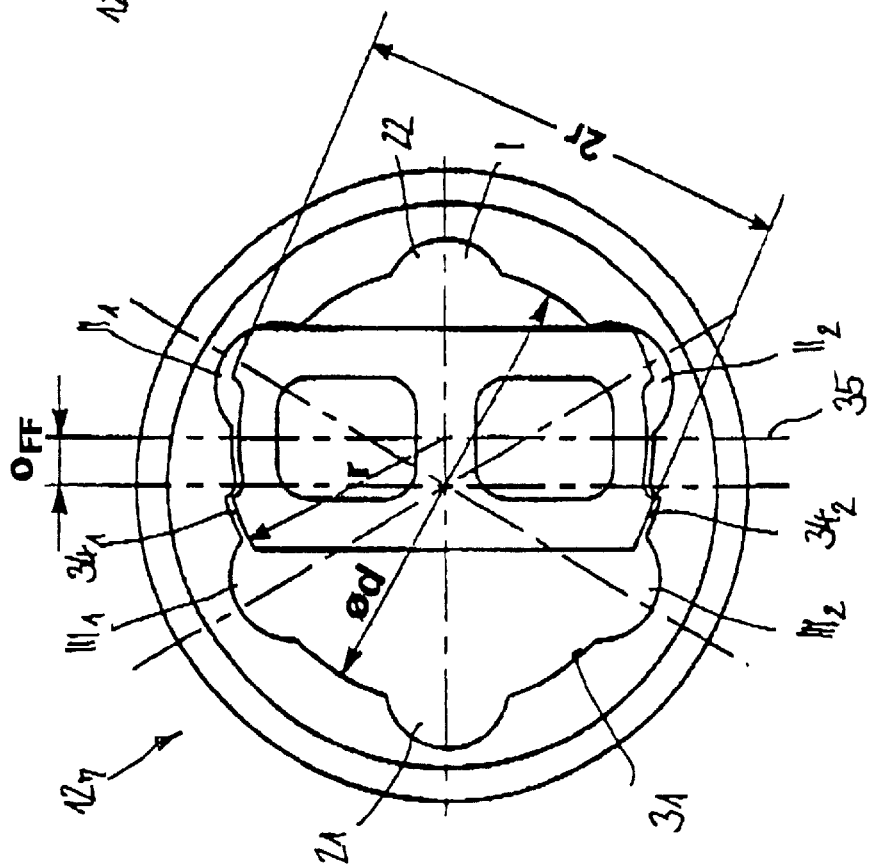
FIG. 7 shows the parts according to FIGS. 5 and 6 during assembly.

In FIG. 7, the outer joint part $12_5$ and the cage $16_5$ are illustrated in views which correspond to those shown in FIGS. 5 and 6, with the mutual association of same indicating the point in time during assembly at which the cage in its radial illustration and in its radial section respectively passes through the plane of the aperture $14_5$. The cage is displaced by an offset $O_{FF}$ towards said first (I) of the second outer ball tracks 22 in such a way that it continues to engage the two ($II_1$, $II_2$) adjoining first outer ball tracks 21 as well as the recesses $34_1$, $34_2$. "r" refers to the radius of the sliding face 32 and "$O_{FF}$" to the offset of the central plane 35 of the cage from the central axis 18 of the outer joint part. The contour of the recesses is defined by an approximately constant distance from the radial illustration of the cage.

Figure 8:
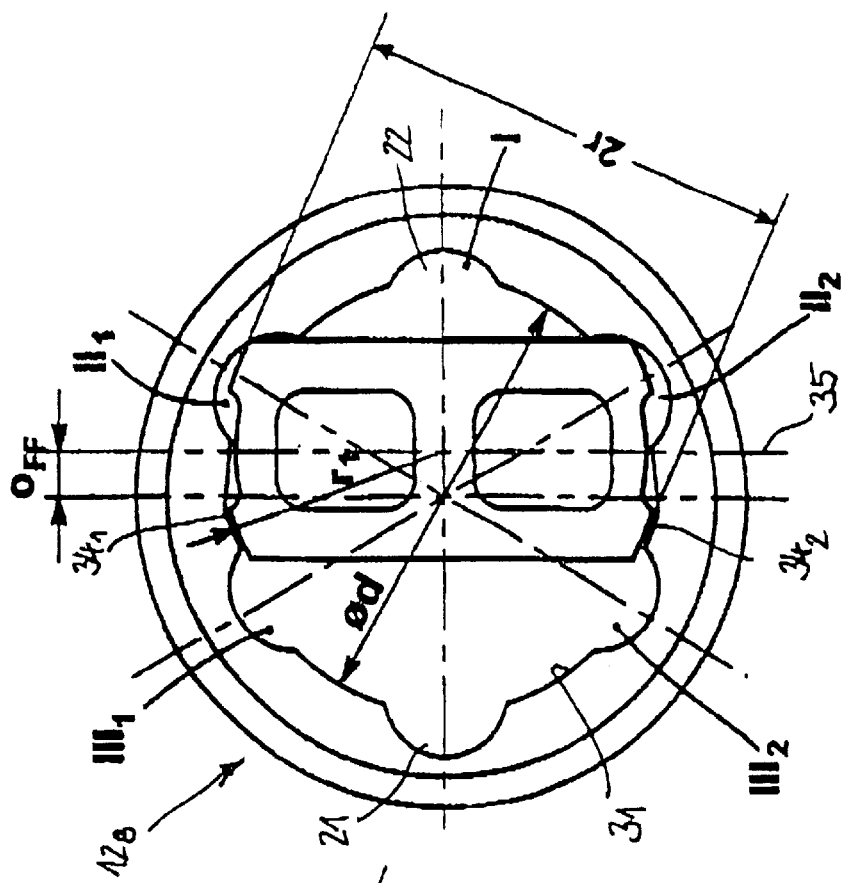
FIG. 8 shows an outer part and a cage of an inventive joint in a third embodiment of the invention in a view analogous to FIG. 7.

In FIG. 8, the outer joint part $12_6$ and the cage $16_6$ are illustrated in a view which corresponds to that shown in FIG. 7, with the mutual association of same indicating the point in time during assembly at which the cage in its radial illustration and in its radial section respectively passes through the plane of the aperture $14_6$. The cage is displaced by an offset ($O_{FF}$) towards said first (I) of the second outer ball tracks 22 in such a way that it continues to engage the two ($II_1$, $II_2$) adjoining first outer ball tracks 21 as well as the recesses $34_1$, $34_2$. "2r" refers to the diameter of the counter face 32 and "$O_{FF}$" to the offset of the central plane 35 of the cage from the central axis 18 of the outer joint part. The recesses are decisively defined by a radius ($r_1$) around the offset center of the cage, which radius ($r_1$) is greater than half the diameter ($\emptyset d/2$) of the aperture of the outer joint part and greater than the radius (r) of the sliding face of the cage. The offset ($O_{FF}$) is determined in that the cage, up to the point of establishing contact with said first outer ball tracks 21 ($II_1$, $II_2$) is offset from a symmetric central position.

Figure 9:
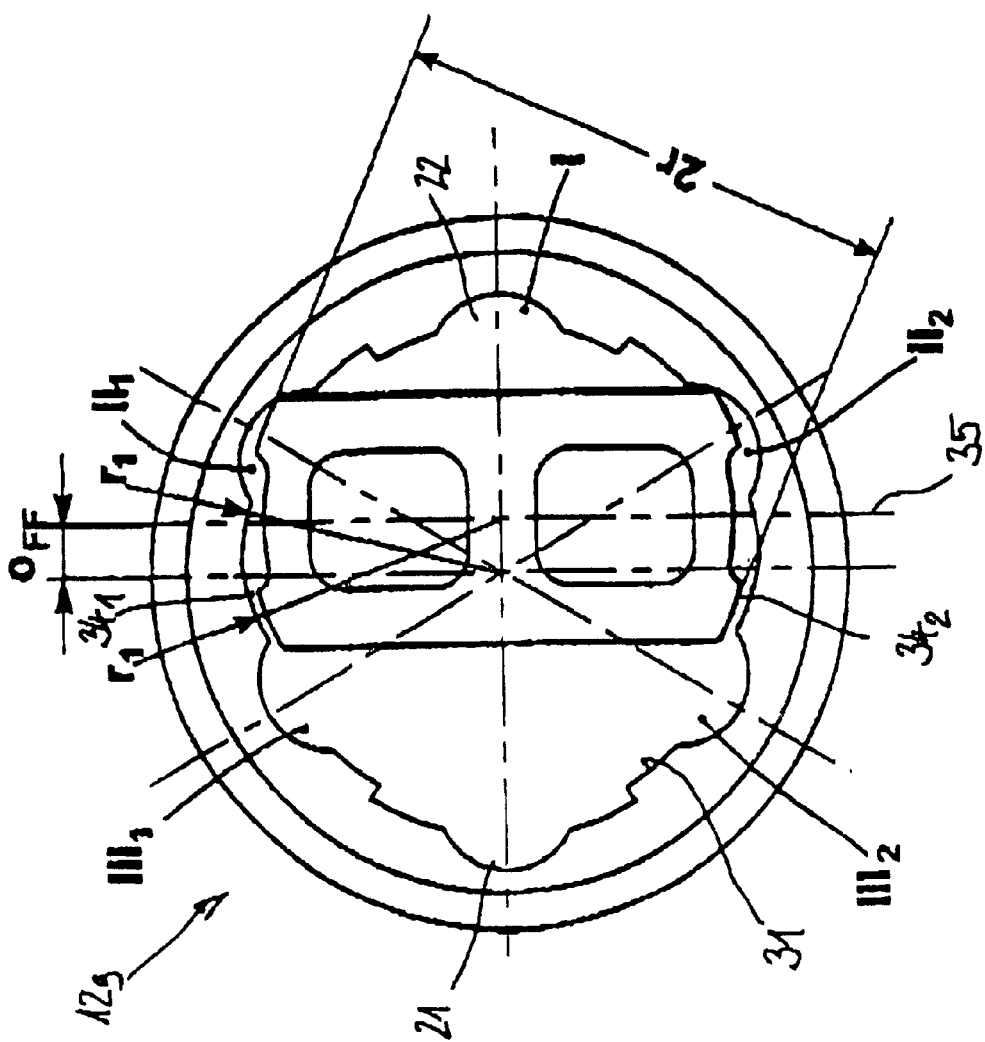
FIG. 9 shows an outer part and a cage of an inventive joint in a fourth embodiment of the invention in a view analogous to FIG. 7.

In FIG. 9, the outer joint part $12_7$ and the cage $16_7$ are illustrated in a view which corresponds to that shown in FIG. 7, with the mutual association of same indicating the point in time during assembly at which the cage in its radial illustration and in its radial section respectively passes through the plane of the aperture $14_5$. The cage is displaced by an offset $O_{FF}$ towards said first (I) of the second outer ball tracks 22 in such a way that it continues to engage the two ($II_1$, $II_2$) adjoining first outer ball tracks 21 as well as the recesses $34_1$, $34_2$. "2r" refers to the diameter of the sliding face 32 and "$O_{FF}$" to the offset of the central plane of the cage from the central axis of the outer joint part. The contour of the recesses is determined by two radii $r_1$ of which the first extends from the offset center of the cage and the second from the center of the aperture. The size of $r_1$ corresponds to that given in FIG. 8.

What is claimed is:

1. A constant velocity fixed joint in the form of a six-ball joint comprising:
   an outer joint part (12) forming a bell-shaped member which comprises a first longitudinal axis (18), a base (13), an aperture (14) and outer ball tracks;
   an inner joint part (15) forming a hub which comprises a second longitudinal axis (19) and inner ball tracks; and
   a ball cage (16) positioned between the outer joint part and the inner joint part and comprising circumferentially distributed cage windows (33) each of said windows (33) adapted to receive a ball (17), said cage windows (33) holding the balls (17) in one plane, said plane defining the central plane of the ball cage;
   wherein the outer ball tracks have centerlines which are curved and extend in planes through the first longitudinal axis (18), and comprise circumferentially alternately arranged three first outer ball tracks (21) and three second outer ball tracks (22), said planes defining central planes of the outer ball tracks;
   wherein the inner ball tracks have center lines which are curved and extend in planes through the second longitudinal axis (19), and comprise circumferentially alternately arranged three first inner ball tracks (23) and three second inner ball tracks (24);
   wherein the first outer ball tracks (21) and the first inner ball tracks (23), together, form three first track pairs and the second outer ball tracks (22) and the second inner ball tracks (24), together, form three second track pairs;
   wherein the track pairs each accommodate a torque transmitting ball, (17) and tangents at the balls in the points of contact with the track pairs lying in planes through the longitudinal axes or in planes being parallel thereto, form control angles with one another;
   wherein the three first track pairs form control angles which open towards the aperture (14) in the outer joint part;
   wherein the three second track pairs form control angles which open towards the base of the outer joint part;
   wherein the outer joint part (12) comprises a substantially internally spherical guiding face (31) for the ball cage, the ball cage (16) comprises an externally spherical sliding face (32) which is in sliding contact with the guiding face (31) and ensures axial positioning; and
   wherein the guiding face (31) in the outer joint part is widened by two recesses (34) which start from the joint aperture (14) and extend approximately in parallel and cylindrically into the joint interior, which—with reference to one (I) of the second outer ball tracks (22)—are positioned between the two (II) first outer ball tracks (21) immediately adjoining said one (I) of the second outer ball tracks and the two (III) second outer ball tracks (22) again immediately adjoining said two (II) first outer ball tracks, and whose cross-sectional contour, while observing an assembly play, is defined by a radial elevational contour of the ball cage (6) when the latter, by means of the central plane of the ball cage, is positioned perpendicularly on the central plane through said one (I) of the second outer ball tracks (22) and brought into simultaneous contact with the two (II) first outer ball tracks (21) immediately adjoining said one (I) of the second outer ball tracks, wherein said ball cage (6) is offset from a symmetric central position in the aperture (14) towards said one (I) of the second outer ball tracks by an offset ($O_{FF}$).

2. A joint according to claim 1, wherein a cross-sectional contour of the recesses ($34_4$) is defined by a circular arch of a diameter (D) which is greater than or equal to a diameter (d) of the guiding face in the plane of the joint aperture and greater than a relative maximum cross-section assembly dimension (m) at the sliding face of the ball cage.

3. A joint according to claim 1, wherein a cross-sectional contour of the recesses ($34_5$) is formed by wedges which are symmetric relative to one other and whose flanks positioned towards said two (III) second outer ball tracks (22) form an angle of approximately 60° relative to one another.

4. A joint according to claim 1, wherein the cross-sectional contour of the recesses ($34_9$) is defined by a circular arch with a radius $r_1$ which is slightly greater than the radius r of the sliding face (32) of the ball cage (16) and which is offset from the central joint axis (18) towards said one (I) of the second outer ball tracks (22).

5. A joint according to claim 1 wherein the outer joint part (12) comprises a base (13) which is integrally formed on and positioned opposite the joint aperture (14).

6. A joint according to claim 2 wherein the outer joint part (12) comprises a base (13) which is integrally formed on and positioned opposite the joint aperture (14).

7. A joint according to claim 3 wherein the outer joint part (12) comprises a base (13) which is integrally formed on and positioned opposite the joint aperture (14).

8. A joint according to claim 4 wherein the outer joint part (12) comprises a base (13) which is integrally formed on and positioned opposite the joint aperture (14).

9. A joint according to claim 1 wherein the outer joint part (12) comprises a base which is welded on and is positioned opposite the joint aperture (14).

10. A joint according to claim 2 wherein the outer joint part (12) comprises a base which is welded on and is positioned opposite the joint aperture (14).

11. A joint according to claim 3 wherein the outer joint part (12) comprises a base which is welded on and is positioned opposite the joint aperture (14).

12. A joint according to claim 4 wherein the outer joint part (12) comprises a base which is welded on and is positioned opposite the joint aperture (14).

13. A method of assembling a constant velocity fixed joint in the form of a six ball joint comprising:

an outer joint part (12) forming a bell-shaped member which comprises a first longitudinal axis (18), a base (13), an aperture (14) and outer ball tracks;

an inner joint part (15) forming a hub which comprises a second longitudinal axis (19) and inner ball tracks; and a ball cage (16) positioned between the outer joint part and the inner joint part and comprising circumferentially distributed cage windows (33) each of said windows (33) adapted to receive a ball (17), said cage windows (33) holding the balls (17) in one plane;

introducing the ball cage (16) into the outer joint part (12) in a position which—with reference to a position which is co-axial relative to the outer joint part (12)—is rotated by 90° around a transverse axis (20) extending through its center (29);

directing the cage (16), when one of its radial cross-sections passes through the plane of the aperture (14) of the outer joint part (12), with its axis (30) to a one (I) of a second outer ball track (22); and offsetting the cage (16) from a symmetric central position in the aperture (14) towards said one (I) of the second outer ball track by an offset ($O_{FF}$).

14. A method according to claim 13 further comprising the steps of rotating the ball cage (16), when one of its radial cross-sections passes through the plane of the aperture (14) of the outer joint part (12), around its axis (30) in such a way that, in a radial elevational contour, two cage windows (33) are visible in a sliding face (32) of the ball cage (16) in a chamfered manner.

* * * * *